United States Patent
Chang et al.

(10) Patent No.: US 10,177,805 B2
(45) Date of Patent: Jan. 8, 2019

(54) METHOD AND APPARATUS FOR TUNING FINITE IMPULSE RESPONSE FILTER IN IN-BAND FULL DUPLEX TRANSCEIVER

(71) Applicant: ELECTRONICS AND TELECOMMUNICATIONS RESEARCH INSTITUTE, Daejeon (KR)

(72) Inventors: Kapseok Chang, Daejeon (KR); Hyung Sik Ju, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 191 days.

(21) Appl. No.: 15/188,597

(22) Filed: Jun. 21, 2016

(65) Prior Publication Data

US 2017/0012762 A1    Jan. 12, 2017

(30) Foreign Application Priority Data

Jun. 25, 2015 (KR) .................. 10-2015-0090792
Jun. 14, 2016 (KR) .................. 10-2016-0074036

(51) Int. Cl.
H04B 1/40      (2015.01)
H04B 1/525     (2015.01)

(52) U.S. Cl.
CPC ............... *H04B 1/40* (2013.01); *H04B 1/525* (2013.01)

(58) Field of Classification Search
None
See application file for complete search history.

(56) References Cited

U.S. PATENT DOCUMENTS

| | | | |
|---|---|---|---|
| 5,886,986 A | 3/1999 | Lee et al. | |
| 8,606,175 B2 | 12/2013 | Kwak et al. | |
| 2008/0181421 A1* | 7/2008 | Inoue ................ | H04M 9/082 381/66 |
| 2010/0191528 A1* | 7/2010 | Okuda ............... | G10L 21/0208 704/231 |
| 2010/0277236 A1* | 11/2010 | Horiguchi ........... | H03F 1/30 330/149 |

* cited by examiner

*Primary Examiner* — Huy D Vu
*Assistant Examiner* — Bao G Nguyen
(74) *Attorney, Agent, or Firm* — LRK Patent Law Firm

(57) ABSTRACT

A method and an apparatus for tuning an FIR filter in an in-band full duplex transceiver. The method for tuning an FIR filter includes: converting an input signal of the FIR filter into a first signal that is a baseband signal; converting a signal obtained by subtracting an output signal of the FIR filter from the self-transmitted interference signal into a second signal that is the baseband signal; and calculating attenuation of the FIR filter using the first signal and the second signal.

15 Claims, 6 Drawing Sheets

FIG. 4

|  260A  |  260B  |
| :---: | :---: |
| s(t) | s(t) |
| s(t) | v(t) |

(a) Ts

|  260A  |  260B  |
| :---: | :---: |
| s(t) | v(t) |
| v(t) | s(t) |
| s(t) | v(t) |

(b)

|  260A  |  260B  |
| :---: | :---: |
| s(t) | v(t) |
| s(t) | v(t) |
| v(t) | s(t) |
| v(t) | s(t) |
| s(t) | v(t) |
| s(t) | v(t) |

(c)

METHOD AND APPARATUS FOR TUNING FINITE IMPULSE RESPONSE FILTER IN IN-BAND FULL DUPLEX TRANSCEIVER

CROSS-REFERENCE TO RELATED APPLICATIONS

This application claims priority to and the benefit of Korean Patent Application Nos. 10-2015-0090792 and 10-2016-0074036, filed in the Korean Intellectual Property Office on Jun. 25, 2015 and Jun. 14, 2016, respectively, the entire contents of which are incorporated herein by reference.

BACKGROUND OF THE INVENTION

1. Field of the Invention

The present invention relates to a method and an apparatus for tuning a finite impulse response (FIR) filter in an in-band full duplex transceiver.

2. Description of the Related Art

Today, most of the wireless communication systems have adopted a half duplex type. The half duplex type divides time or frequency to perform transmission or reception, thereby maintaining orthogonality between the transmission and reception. However, the half duplex type wastes resources (time or frequency).

An in-band full duplex (IFD) type has been suggested as a solution for solving inefficiency of the half duplex type. The in-band full duplex type is a technology of simultaneously performing transmission and reception in an in-band. The in-band full duplex type may theoretically increase link capacity up to twice, and therefore is an indispensable technology for achieving 1000 times traffic capacity required in 5G mobile communication.

However, the in-band full duplex (IFD) type has a problem in that a self-transmitted signal is introduced into a receiver and therefore the self-transmitted signal is very stronger than a valid received signal, such that the self-transmitted signal acts as a self-interference signal. For self-interference cancellation (SIC), there is an antenna region SIC technology of significantly spacing a transmitting antenna and a receiving antenna apart from each other. A technology for reducing a self-interference level using the antenna region SIC technology and canceling self-interference remaining in a digital region is in a commercialization stage. However, the technology is hardly applied to a small apparatus due to a physical space between the transmitting and receiving antennas.

For applying the in-band full duplex (IFD) type to the small apparatus, a technology for canceling self-interference in an analog circuit region without the help of the physical space between the antennas is required. As the SIC technology of the analog circuit region, there are largely a passive SIC technology and an active SIC technology. The passive SIC technology may use a passive element to easily obtain an SIC gain. However, the SIC gain is limited. Meanwhile, the active SIC technology may use an adaptive analog finite impulse response (FIR) filter circuit to obtain the SIC technology gain higher than that of the passive SIC technology. In this case, there is a problem in that the existing active SIC technology may not continuously maintain the high SIC gain while being quickly adapted to a change in surrounding environment over a wideband.

SUMMARY OF THE INVENTION

The present invention has been made in an effort to provide a method and an apparatus for tuning a finite impulse response (FIR) filter having advantages of allowing an in-band full duplex transceiver to have a high SIC gain.

An exemplary embodiment of the present invention provides a method for tuning a finite impulse response (FIR) filter in an in-band full duplex transceiver, the FIR filter receiving a transmission signal to cancel a self-transmitted interference signal, the method including:

The method for tuning an FIR filter includes: converting an input signal of the FIR filter into a first signal that is a baseband equivalent signal; converting a signal obtained by subtracting an output signal of the FIR filter from the self-transmitted interference signal into a second signal that is the baseband equivalent signal; calculating attenuation of the FIR filter using the first signal and the second signal; and applying the attenuation to the FIR filter.

The method may further include: estimating a delta time response using the first signal and the second signal.

The calculating of the attenuation may include calculating the attenuation using the delta time response.

The delta time response may correspond to a value obtained by subtracting a baseband equivalent time impulse response for the FIR filter from a baseband equivalent time impulse response for a radio channel.

The method may further include: acquiring a third signal by performing fast Fourier transform (FFT) on the first signal; and acquiring a fourth signal by performing the FFT on the second signal, in which the calculating of the attenuation may include calculating the attenuation using the third signal and the fourth signal.

The method may further include: estimating a delta frequency response using the third signal and the fourth signal.

The calculating of the attenuation may include calculating the attenuation using the delta frequency response.

The delta frequency response may correspond to a value obtained by subtracting the frequency response of the FIR filter from the frequency response of the radio channel.

The input signal of the FIR filter may include a linear component and a nonlinear component.

Another embodiment of the present invention provides an in-band full duplex transceiver. The in-band full duplex transceiver includes: a transmitter generating and transmitting a transmitted signal; a finite impulse response (FIR) filter receiving the transmitted signal to cancel a self-transmitted interference signal; a receiver converting a first signal that is a signal obtained by subtracting an input signal of the FIR filter from the self-transmitted interference signal into a second signal that is a baseband frequency signal and converting an input signal of the FIR filter into a third signal that is a baseband frequency signal; and an estimator using the second signal and the third signal to set the attenuation of the FIR filter.

The receiver may include: a first baseband converter converting the first signal into the second signal; and a second baseband converter converting the input signal of the FIR filter into the third signal.

The first baseband converter may include a variable gain controller receiving the first signal to adjust a power level, a first mixer multiplying a carrier frequency by an output signal of the variable gain controller to converting an RF signal into a baseband frequency signal, and a first analog digital converter converting an output signal of the first mixer into a digital signal, and the second baseband converter may include a low noise amplifier receiving and amplifying the first signal, a second mixer multiplying the carrier frequency by an output signal of the low noise amplifier to converting the RF signal into the baseband frequency signal, and a second analog digital converter converting an output signal of the second mixer into the digital signal The first signal and the input signal of the FIR filter may be shuffled to be input to the first baseband converter and the second baseband converter, respectively.

The estimator may estimate a delta time response using the second signal and the third signal and calculate the attenuation using the delta time response.

The estimator may acquire a fourth signal by performing fast Fourier transform (FFT) on the second signal and a fifth signal by performing the FFT on the third signal and calculate the attenuation using the fourth signal and the fifth signal.

The estimator may estimate a delta frequency response using the fourth signal and the fifth signal and calculate the attenuation using the delta frequency response.

The delta time response may correspond to a value obtained by subtracting a baseband equivalent time impulse response for the FIR filter from a baseband equivalent time impulse response for a radio channel.

The delta frequency response may correspond to a value obtained by subtracting the frequency response of the FIR filter from the frequency response of the radio channel.

Yet another embodiment of the present invention provides a method for tuning a finite impulse response (FIR) filter in an in-band full duplex transceiver, the in-band full duplex transceiver including a transmitter generating and transmitting a transmitted signal, a receiver converting a received signal into a baseband frequency signal, and the FIR filter receiving the transmitted signal to cancel a self-transmitted interference signal. The method for tuning an FIR filter may include converting an input signal of the FIR filter into a first signal that is a baseband frequency signal; converting a signal obtained by subtracting an output signal of the FIR filter from the self-transmitted interference signal into a second signal that is the baseband frequency signal; estimating a delta response using the first signal and the second signal; calculating attenuation of the FIR filter using the delta response; and applying the attenuation to the FIR filter.

The delta response may be a delta time response or a delta frequency response.

According to an exemplary embodiment of the present invention, it is possible to continuously maintain the high SIC gain while being quickly adapted to the change in surrounding environment over a wideband by setting the attenuation of the FIR filter using the baseband equivalent signal for the input signal of the FIR filter.

BRIEF DESCRIPTION OF THE DRAWINGS

FIG. 4 is a diagram illustrating a shuffling method of a baseband converter according to an exemplary embodiment of the present invention.

DETAILED DESCRIPTION OF THE EMBODIMENTS

Figure 1:
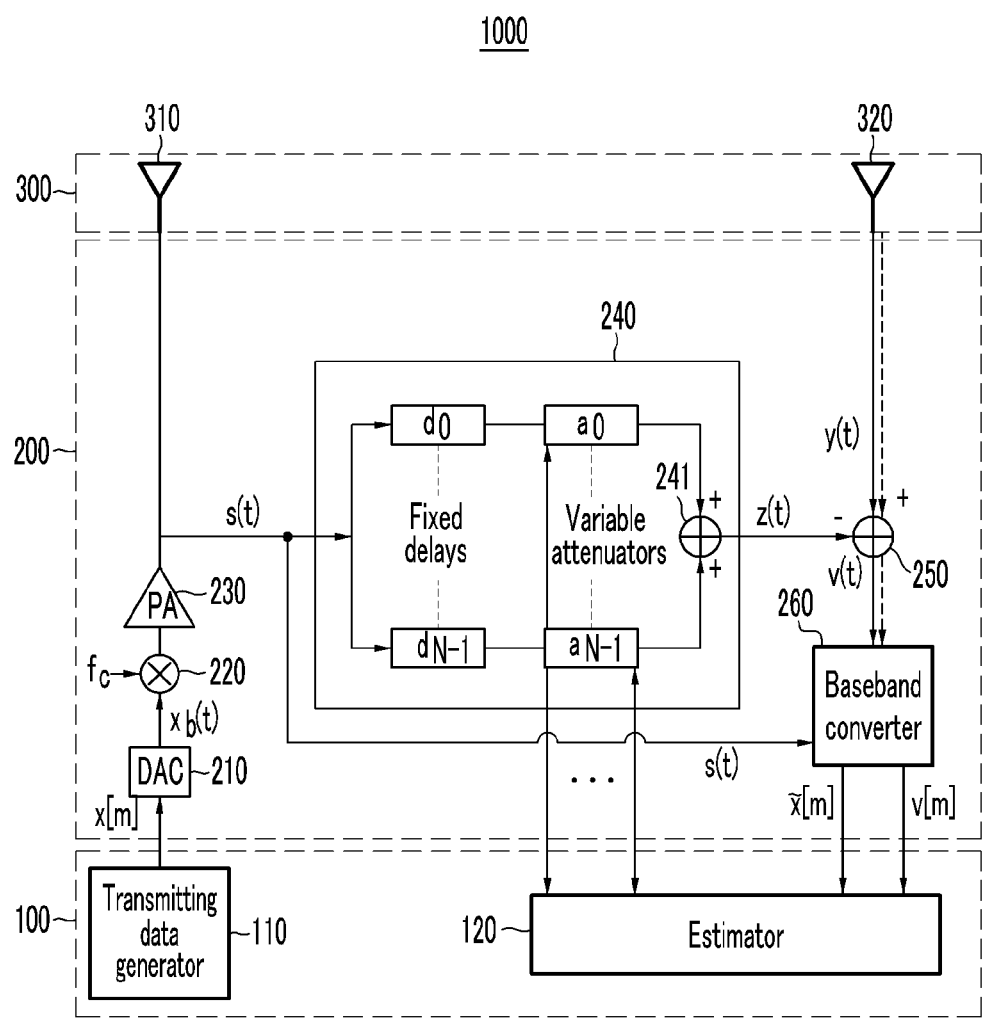
FIG. 1 is a diagram illustrating an in-band full duplex transceiver 1000 according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a terminal may be called a mobile terminal (MT), a mobile station (MS), an advanced mobile station (AMS), a high reliability mobile station (HR-MS), a subscriber station (SS), a portable subscriber station (PSS), an access terminal (AT), user equipment (UE), and the like and may include functions of all or some of the terminal, the MT, the AMS, the HR-MS, the SS, the PSS, the AT, the UE, and the like Further, a base station (BS) may be called an advanced base station (ABS), a high reliability base station (HR-BS), a nodeB, an evolved node B (eNodeB), an access point (AP), a radio access station (RAS), a base transceiver station (BTS), a mobile multihop relay (MMR)-BS, a relay station (RS) serving as a base station, a high reliability relay station (HR-RS) serving as a base station, and the like and may also include functions of all or some of the ABS, the nodeB, the eNodeB, the AP, the RAS, the BTS, the MMR-BS, the RS, the HR-RS, and the like.

Throughout the specification, a transceiver may refer to a terminal, a mobile terminal (MT), a mobile station (MS), an advanced mobile station (AMS), a high reliability mobile station (HR-MS), a subscriber station (SS), a portable subscriber station (PSS), an access terminal (AT), user equipment (UE), and the like and may include functions of all or some of the terminal, the MT, the AMS, the HR-MS, the SS, the PSS, the AT, the UE, and the like Further, a transceiver may refer to a base station(BS), an advanced base station (ABS), a high reliability base station (HR-BS), a nodeB, an evolved node B (eNodeB), an access point (AP), a radio access station (RAS), a base transceiver station (BTS), a mobile multihop relay (MMR)-BS, a relay station (RS) serving as a base station, a high reliability relay station (HR-RS) serving as a base station, and the like and may also include functions of all or some of the ABS, the nodeB, the eNodeB, the AP, the RAS, the BTS, the MMR-BS, the RS, the HR-RS, and the like.

FIG. 1 is a diagram illustrating an in-band full duplex transceiver 1000 according to an exemplary embodiment of the present invention.

As illustrated in FIG. 1, the in-band full duplex transceiver 1000 according to the exemplary embodiment of the present invention includes a baseband digital region transmitting/receiving unit 100, an analog circuit region transmitting/receiving unit 200, and an antenna unit 300.

The baseband digital region transmitting/receiving unit 100 includes a transmitting data generator 110 and an estimator 120. Although not illustrated in FIG. 1, the baseband digital region transmitting/receiving unit 100 may further include a receiving data demodulation generator. The transmitting data generator 110 performs encoding and modulation to generate a digital signal corresponding to data to be transmitted. In FIG. 1, an output signal of the transmitting data generator 110, that is, a baseband time domain signal is represented by x[m]. A receiving data demodulation generator (not illustrated in FIG. 1) performs demodulation and decoding on receiving data. The estimator 120 sets attenuations for each tab of a finite impulse response (FIR) filter 240. The estimator 120 according to the exemplary embodiment of the present invention receives a baseband equal signal x̂[m] for input information of the FIR filter 240 and a baseband equivalent signal v[m] for an output signal of a signal coupler 250 from a baseband converter 260 to set the attenuations for each tab of the FIR filter 240. Further, the estimator 120 according to the exemplary embodiment of the present invention may use the information input from the baseband converter 260 to set the attenuations of each tab of the FIR filter 240, thereby canceling SIC.

The analog circuit region transmitting/receiving unit 200 includes a digital analog converter (DAC) 210, a mixer 220, a power amplifier (PA) 230, the FIR filter 240, the signal coupler 250, and the baseband converter 260. The transmitting data generator 110, the DAC 210, the mixer 220, and the PA 230 form a transmitter. Further, the signal coupler 250, the baseband converter 260, and the receiving data demodulation generator form a receiver.

The DAC 210 converts a digital signal into an analog signal, the mixer 220 uses a carrier frequency $f_C$ to convert a baseband frequency signal into a radio frequency band signal. The PA 230 amplifies and outputs the RF band signal. In FIG. 1, an output signal of the DAC 210 is represented by $x_b(t)$ and an output signal of the PA 230, that is, a final transmitted signal is represented by s(t). The s(t) that is the final transmitted signal includes a nonlinear component (harmonics component and phase noise component) due to the mixer 220 and the PA 230. As described below, the baseband converter 120 according to the exemplary embodiment of the present invention converts the s(t) including the nonlinear component into the baseband equivalent information v[m].

The antenna unit 300 includes a transmitting antenna 310 and a receiving antenna 320. The transmitting antenna 310 transmits the transmitted signal s(t) to the outside and the receiving antenna 320 receives a received signal. The transmitting antenna 310 and the receiving antenna 320 physically approaches each other, and therefore the transmitted signal s(t) is introduced through the receiving antenna 320 to act as an interference signal, in which the interference signal is a self-transmitted interference signal. The reason is that the transceiver 1000 according to the exemplary embodiment of the present invention is operated by an in-band full duplex type. The signal received through the receiving antenna 320 includes a self-transmitted interference signal as well as a normal received signal. In FIG. 1, the self-transmitted interference signal is represented by y(t). As described below, according to the exemplary embodiment of the present invention, the self-transmitted interference signal y(t) may be canceled using the FIR filter 20.

The FIR filter 240 receives the transmitted signal s(t) and generates and outputs a signal minimizing the self-transmitted interference signal y(t). As illustrated in FIG. 1, the FIR filter 240 according to the exemplary embodiment of the present invention includes a plurality of delayers $d_0$–$d_{N-1}$, a plurality of attenuators $a_0$–$a_{N-1}$, and a signal coupler 241.

The plurality of delayers $d_0$–$d_{N-1}$ each have a fixed delay. All delay intervals between the respective delayers $d_i$ (i=0, 1, ..., N-1) may be the same or different and the delayers may be divided into a plurality of groups having the same delay interval. Here, N represents the total number of tabs and $d_i$ (i=0, 1, 2, ..., N-1) represents a delay applied to the tab.

The plurality of attenuators $a_0$–$a_{N-1}$ are connected to the plurality of delayers $d_0$–$d_{N-1}$, respectively and attenuate signals. Attenuations of the respective attenuators $a_i$ (i=0,1,2..., N-1) vary and are set by the estimator 120. Values of the attenuations of the respective attenuators $a_i$ (i=0,1,2..., N-1) may have one of a size, a size and phase, a real value, and a complex value. For convenience, the following description will be made under the assumption that the attenuation has the size or the real value.

The signal coupler 241 couples output signals of the plurality of attenuators $a_0$–$a_{N-1}$. The signal coupler 241 adds and couples all the output signals of the plurality of attenuators $a_0$–$a_{N-1}$. In FIG. 1, the output signal of the signal coupler 241, that is, the output signal of the FIR filter 240 is represented by z(t).

The signal coupler 250 couples the received signal with the output signal of the FIR filter 240 and then output the coupled signal to the baseband converter 260. The signal coupler 250 subtracts the output signal of the FIR filter 240 from the received signal and then couples the two signals. In this case, the FIR filter 240 outputs the signal minimizing the self-transmitted interference signal y(t), and therefore the signal coupler 250 outputs a signal obtained by canceling the self-transmitted interference signal y(t) from the received signal to the baseband converter 260. In FIG. 1, the output signal of the signal coupler 250 is represented by v(t).

The baseband converter 260 receives the input signal s(t) of the FIR filter 240 with the output signal v(t) of the signal coupler 250 converts the respective signals into the baseband frequency signal. The detailed configuration and operation of the baseband converter 260 will be described below in detail with reference to FIG. 3.

Figure 2:
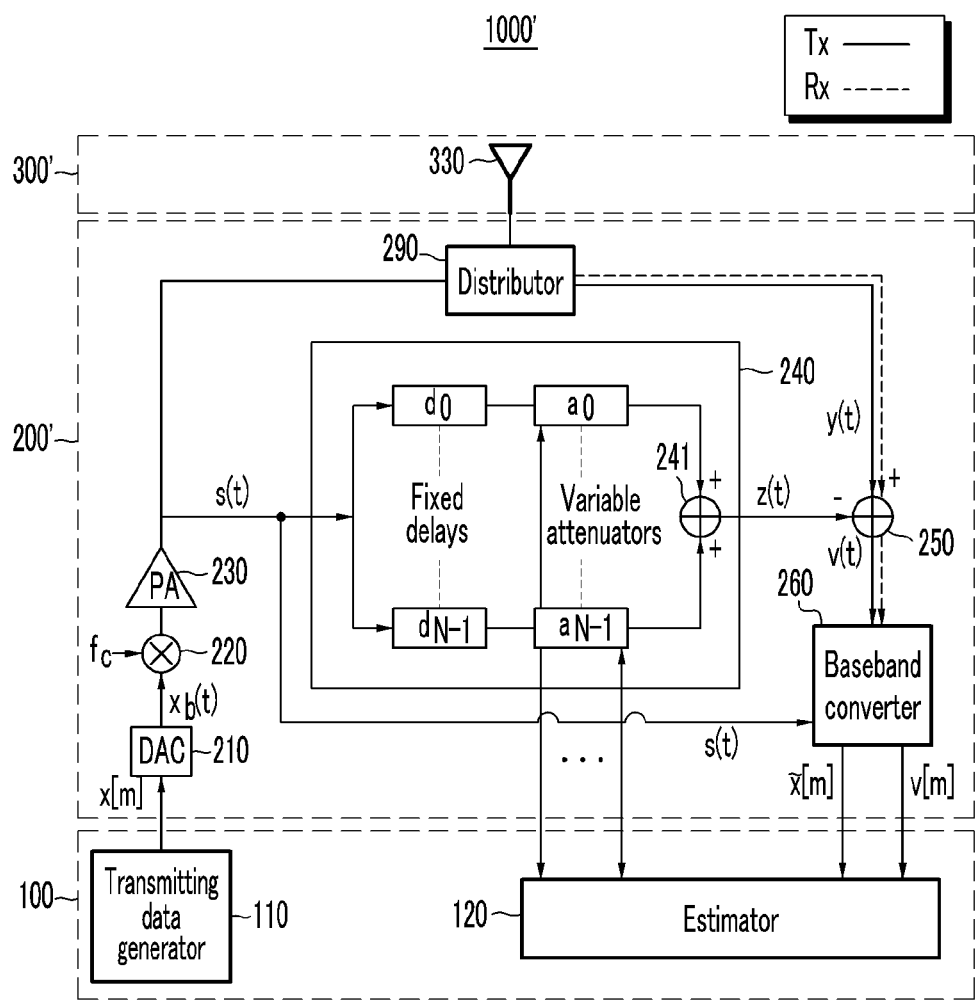
FIG. 2 is a diagram illustrating an in-band full duplex transceiver 1000' according to another exemplary embodiment of the present invention.

FIG. 2 is a diagram illustrating an in-band full duplex transceiver 1000' according to another exemplary embodiment of the present invention.

As illustrated in FIG. 2, the in-band full duplex transceiver 1000' according to another exemplary embodiment of the present invention includes the baseband digital region transmitting/receiving unit 100, an analog circuit region transmitting/receiving unit 200', and an antenna unit 300'. Except that the antenna unit 300' is configured of one transmitting/receiving antenna and the analog circuit region transmitting/receiving unit 200' further includes a distributor 290, the in-band full duplex transceiver 1000' is the same as FIG. 1, and therefore the description of the overlapping components with FIG. 1 will be omitted.

For the in-band full duplex type, the antenna unit 300' is configured of a transmitting/receiving antenna 330 that simultaneously performs a transmitter function and a receiver function. That is, through the antenna 330, the transmitted signal is transmitted and the received signal is received.

The analog circuit region transmitting/receiving unit 200' further includes the distributor 290. The distributor 290 is connected to the antenna 330 and transmits the transmitted signal s(t) to the antenna 330. Further, the distributor 290 transmits the received signal received from the antenna 330 to a receiving module (signal coupler 250, LNA 260, or the like of FIG. 1). That is, the distributor 290 according to the exemplary embodiment of the present invention serves to transmit the transmitted signal to the antenna 330 and transmit the received signal to the receiving module. The distributor 290 may be implemented as a circulator, an electrical balance duplexer (EBD), etc. The circulator and the EBD may be appreciated by a person having ordinary skill in the art to which the present invention pertains and the detailed description thereof will be omitted.

Figure 3:
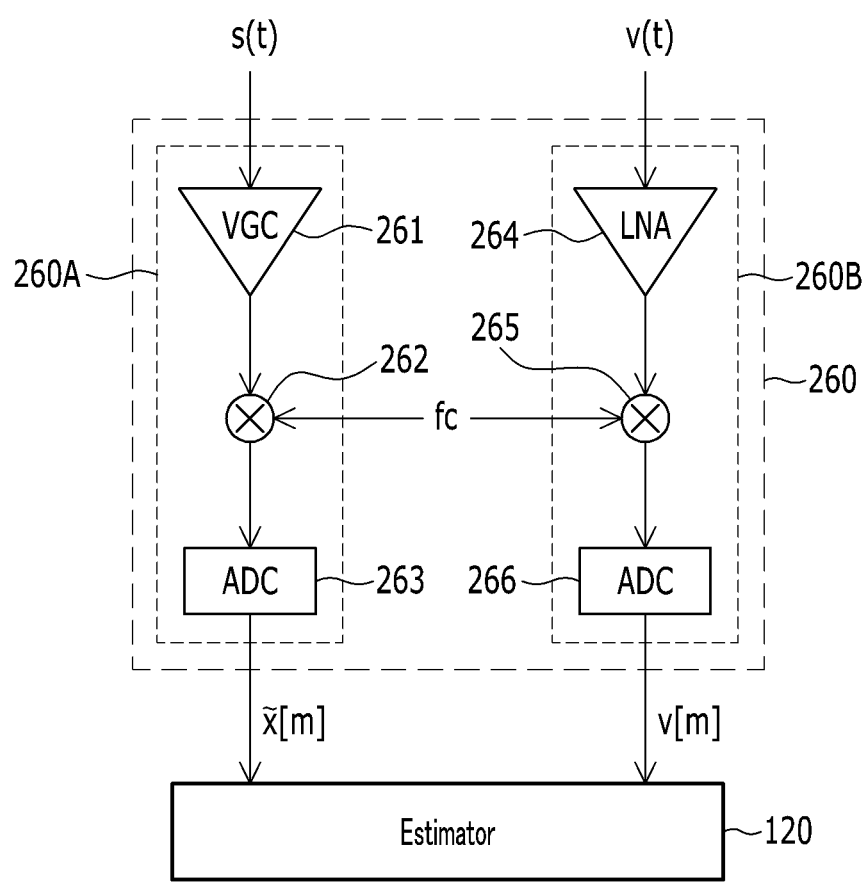
FIG. 3 is a block diagram illustrating a baseband converter according to an exemplary embodiment of the present invention.

FIG. 3 is a block diagram illustrating the baseband converter 260 according to the exemplary embodiment of the present invention.

As illustrated in FIG. 3, the baseband converter 260 according to the exemplary embodiment of the present invention includes a first baseband converter 260A and a second baseband converter 260B.

The first baseband converter 260A receives the input signal s(t) of the FIR filter 240 and converts the received input signal s(t) into a baseband equivalent signal x̃[m]. The first baseband converter 260A includes a variable gain controller (VGA) 261, a mixer 262, and an analog digital converter (ADC) 263. The VGA 261 serves to receive the input signal s(t) of the FIR filter 240 and to set the received input signal s(t) to be the same as or similar to a power level for a signal for a latter stage of th LAN 264 included in the second baseband converter 260B. The mixer 262 multiplies the carrier frequency $f_c$·by the output signal of the VGC 261 to convert the RF signal into the baseband frequency signal. The ADC 263 converts the baseband frequency signal that is an analog signal into a digital signal. As such, the input signal s(t) of the FIR filter 240 is converted into the baseband equivalent signal x̃[m] by using the VGA 261, the mixer 262, and the ADC 263.

The second baseband converter 260B receives the output signal v(t) of the signal coupler 250 and converts the received output signal v(t) into the baseband equivalent signal v[m]. The second baseband converter 260B includes a low noise amplifier (LNA) 264, a mixer 266, and an analog digital converter (ADC) 266. The LNA 264 receives the output signal v(t) of the signal coupler 250 and cancels and amplifies noise from the received signal. The mixer 265 multiplies the carrier frequency $f_c$·by the output signal of the LNA 264 to convert the RF signal into the baseband frequency signal. The ADC 266 converts the baseband frequency signal that is an analog signal into the digital signal. As such, the output signal v(t) of the signal coupler 250 is converted into the baseband equivalent signal v[m] by using the LNA 264, the mixer 266, and the ADC 266.

As described above, hardware impairment may be present between elements in the baseband converter 260 according to the exemplary embodiment of the present invention. That is, the hardware impairment may be present between the VGC 261 and the LNA corresponding thereto, between the mixers 262 and 265, and between the ADCs 263 and 266. Therefore, performance may deteriorate when the estimator 120 may finally estimate the attenuation for each tab To reduce the hardware impairment, a shuffling method may be used as illustrated in the following FIG. 4. The shuffling method will be described in detail with reference to FIG. 4. Meanwhile, the baseband converter 260 according to the exemplary embodiment of the present invention may simultaneously use the same training signal to estimate the x̃[m] and the v[m]. Here, the training signal standardized in the general wireless communication system may be reused, and therefore there is no need to design a separate training signal.

FIG. 4 is a diagram illustrating the shuffling method of the baseband converter 260 according to the exemplary embodiment of the present invention. The method for implementing shuffling described below may be implemented using a switch, which may be appreciated by a person having ordinary skill in the art to which the present invention pertains. Therefore, the detailed method thereof will be omitted.

(a) of FIG. 4 is a diagram illustrating a first shuffling method. As illustrated in (a) of FIG. 4, the input signal s(t) of the FIR filter 240 is input only to the first baseband converter 260A and the output signal v(t) of the signal coupler 250 is input only to the second baseband converter 260B. That is, the foregoing method is a method described in FIG. 3 and is a case in which the shuffling method is not used.

(b) of FIG. 4 is a diagram illustrating a second shuffling method. As illustrated in (a) of FIG. 4, the input signal s(t) of the FIR filter 240 is alternately input to the first baseband converter 260A and the second baseband converter 260B every minimum shuffling period Ts. Further, the output signal v(t) of the signal coupler 250 is also alternately input to the second baseband converter 260B and the first baseband converter 260A every minimum shuffling period Ts.

(c) of FIG. 4 is a diagram illustrating a third shuffling method. As illustrated in (c) of FIG. 4, the input signal s(t) of the FIR filter 240 is alternately input to the first baseband converter 260A and the second baseband converter 260B every twice of the minimum shuffling period Ts. Further, the output signal v(t) of the signal coupler 250 are also alternately input to the second baseband converter 260B and the first baseband converter 260A every twice of the minimum shuffling period Ts.

Meanwhile, when the shuffling method of FIG. 4 is used, the shuffling may be made between all the elements of the first baseband converter 260A and all the elements of the second baseband converter 260B, but the shuffling may be made over some of the elements. As an example in which the shuffling is made between some elements, the shuffling may be made between the VGC 261 and the mixer 262 and between the LNA 264 and the mixer 265.

Hereinafter, a method for tuning, by the estimator 120 according to the exemplary embodiment of the present invention, the FIR filter 240 will be described. In the following description, the method for tuning the FIR filter 240 will be described with reference to FIG. 2 but may be applied even to the FIG. 1.

To describe the method for tuning, by the estimator 120, the FIR filter 240, first, various signals of the in-band full duplex transceiver 1000' is mathematically modeled.

x[m] means a baseband time domain signal oversampled by d times. If d=1, x[m] means a time domain signal that is baseband-sampled. If the sampled signal passes through the DAC 210, a baseband analog signal $x_b(t)$ is generated like the following Equation 1.

$$x_b(t) = \Sigma \, x[m] \sin c(Wt-m) \quad \text{(Equation 1)}$$

In the above Equation 1, x[m] is $x_b(m/W)$ and sin c(t) is defined like the following Equation 2.

$$\text{sinc}(t) = \frac{\sin(\pi t)}{\pi t} \quad \text{(Equation 2)}$$

For the representation of the above Equation 1, a sampling theorem is applied. That is, the sampling theorem that all the baseband waveforms band limited in W/2 may be represented by a linear combination of coefficients (i.e., x[m]) given by samples with an orthogonal basis $\{\sin c(Wt-m)\}_m$ is applied to the above Equation 1. In the above Equation 1, W may represent a bandwidth and may be a system bandwidth of the baseband and a bandwidth oversampled by d times. For convenience, the following description will be made under the assumption that the W is a bandwidth oversampled by one time (d=1), but a value of d may be set to be another value.

If $x_b(t)$ passes through the mixer 220, it becomes the RF signal, and if the RF signal passes through the PA 230, it becomes the time domain input signal s(t) of the FIR filter 240. If the s(t) is mathematically represented, it becomes the following Equation 3.

$$s(t)=\sqrt{2P}Re\{\tilde{x}_b(t)e^{-j\pi f_c t}\} \quad \text{(Equation 3)}$$

In the following Equation 3, $\tilde{x}_{b(t)}$ represents the baseband equivalent signal for the RF signal including the nonlinear component generated while the $x_b(t)$ passes through the PA 230. P represents transmit power amplified by the PA 230 and $f_c$ represents the carrier frequency of the mixer 220. Hereinafter, a frequency domain expression for the s(t) in the above Equation 3 is defined by S(f). In this case, f represents the RF frequency.

The RF signal s(t) in the above Equation 3 passes through the FIR filter 240 and the time domain expression of the passing RF signal becomes the following Equation 4.

$$z(t)=h_{fir}(t)*s(t) \quad \text{(Equation 4)}$$

In the above equation 4, $h_{fir}(t)$ represents a time impulse response of the RF region for the FIR filter 240. The baseband equivalent time impulse response for the $h_{fir}(t)$ becomes the following Equation 5.

$$h_{fir}^b[l] = \sum_i a_i e^{-j2\pi f_c d_i} \text{sinc}[l - d_i W] \quad \text{(Equation 5)}$$

In the above Equation 5, $d_i$ (i=0, 1, ..., N−1) and $a_i$ (i=0, 1, ..., N−1) each represent time delays and path attenuations for each tab of the FIR filter 240. Further, l represents an index of a filter tab. If a digital (baseband) region equivalent signal z[m] for z(t) that is an output of the FIR filter 240 depends on the above Equation 5, the z[m] becomes the above Equation 6.

$$z[m] = \sum_l \tilde{x}[m-l]h_{fir}^b[l] \quad \text{(Equation 6)}$$

$$= \sum_l \tilde{x}[m-l]\sum_{i=0}^{N-1} a_i e^{-j2\pi f_c d_i}\text{sinc}[l-d_i W],$$

$$m = 0, 1, \ldots, M-1$$

In the equation 6, $\tilde{x}[m]=\tilde{x}_b(m/W)$ by the above Equation 3, in which M represents a maxim sample number of a time domain.

Using the expression of the above Equations 4 to 6, the equivalent time domain expression y[m] in the digital (baseband) region for the self-transmitted interference signal y(t) becomes the following Equation 7.

$$y[m] = \sum_l \tilde{x}[m-l]h_{ch}^b[l] \quad \text{(Equation 7)}$$

$$= \sum_l \tilde{x}[m-l]\sum_{i=0}^{N'-1} b_i e^{-j2\pi f_c \tau_i}\text{sinc}[l-\tau_i W],$$

$$m = 0, 1, \ldots, M-1$$

In the Equation 7, $h_{ch}^b[l]$ represents the baseband (digital region) equivalent time impulse response for the channel generated by characteristics of the distributor 290 and the antenna 330. Further, $b_i$ and $\tau_i$ each depend on the path attenuation and the time delay for each multipath i for the channel generated by the characteristics of the distributor 290 and the antenna 330. N' represents the total number of multipaths for the channel.

Figure 5:
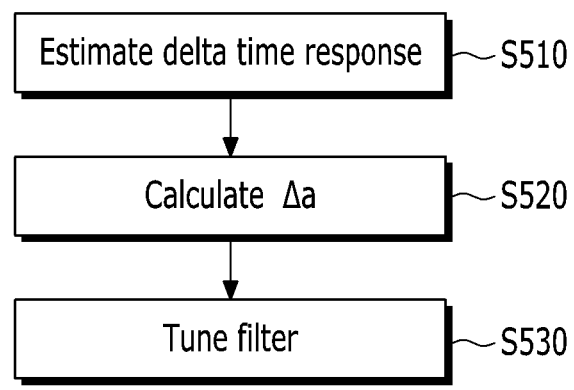
FIG. 5 is a flow chart of a method for tuning an FIR filter according to a first exemplary embodiment of the present invention.

FIG. 5 is a flow chart of a method for tuning an FIR filter according to a first exemplary embodiment of the present invention. The method for tuning an FIR filter according to the first exemplary embodiment of the present invention is a method for processing, by the estimator 120, data in a time domain to tune the FIR filter 240.

First, the estimator 120 estimates a delta time response (S510). If the above Equations 4 to 7 are applied to the v[m] input from the second baseband converter 260B, the v[m] is represented by the following Equation 8.

$$v[m] = y[m] - z[m] \quad \text{(Equation 8)}$$

$$= \sum_l \tilde{x}[m-l](h_{ch}^b[l] - h_{fir}^b[l])$$

$$= \sum_l \tilde{x}[m-l]\Delta h_{fir}^b[l].$$

In the above Equation 8, $\Delta h_{fir}^b[l]$ becomes the delta time response to be estimated by the estimator 120. $\Delta h_{fir}^b[l]$ becomes $h_{ch}^b[l]-h_{fir}^b[l]$. Referring to the above Equation 5, $\Delta h_{fir}^b[l]$ is represented by the following Equation 9. $h_{ch}^b[l]$ represents the baseband equivalent time impulse response for a radio channel and $h_{fir}^b[l]$ is the same as the above Equation 5.

$$\Delta h_{fir}^b[l] = \sum_i \Delta a_i e^{-j2\pi f_c d_i}\text{sinc}[l-d_i W] \quad \text{(Equation 9)}$$

In the above Equation 9, $\Delta a_i$ represents update attenuation of an i-th attenuator. If a matrix expression for the above Equation 9 is obtained, it becomes the following Equation 10.

$$v=A_{\tilde{x}}\Delta h_{fir}. \quad \text{(Equation 10)}$$

In the above Equation 10, $A_{\tilde{x}}$ is a Toeplitz matrix of $\tilde{x}[m]$ and the $\tilde{x}[m]$ is a signal input from the first baseband converter 260B to the estimator 120. $A_{\tilde{x}}$ is represented by the following Equation 11. That is, the estimator 120 may apply the received $\tilde{x}[m]$ to the following Equation 11 to calculate the $A_{\tilde{x}}$.

$$A_{\tilde{x}} = \begin{bmatrix} \tilde{x}[-c] & \ldots & \tilde{x}[-1] & \tilde{x}[0] & \ldots & \tilde{x}[c-1] \\ \tilde{x}[1-c] & \ldots & \tilde{x}[0] & \tilde{x}[1] & \ldots & \tilde{x}[c] \\ \vdots & \vdots & \vdots & \vdots & \vdots & \vdots \\ \tilde{x}[M-1-c] & \ldots & \tilde{x}[M-2] & \tilde{x}[M-1] & \ldots & \tilde{x}[M+c-2] \end{bmatrix}$$ (Equation 11)

or $$A_{\tilde{x}} = \begin{bmatrix} \tilde{x}[c-1] & \ldots & \tilde{x}[1] & \tilde{x}[0] & \ldots & \tilde{x}[-c] \\ \tilde{x}[c] & \ldots & \tilde{x}[2] & \tilde{x}[1] & \ldots & \tilde{x}[1-c] \\ \vdots & \vdots & \vdots & \vdots & \vdots & \vdots \\ \tilde{x}[c+M-2] & \ldots & \tilde{x}[M] & \tilde{x}[M-1] & \ldots & \tilde{x}[M-c-1] \end{bmatrix}$$

In the above equation 11, c represents the number of non-causal elements (i.e., samples).

In the above Equation 10, $\Delta h_{fir}$ represents a delta time response vector added to the current baseband equivalent time impulse response to update the time impulse response characteristics of the FIR filter 240. The $\Delta h_{fir}$ is a vector expression for the above Equation 9 and is represented by the following Equation 12.

$$\Delta h_{fir} = [\Delta h_{fir}^b[-c] \Delta h_{fir}^b[-c+1] \ldots \Delta h_{fir}^b[0] \Delta h_{fir}^b[1] \ldots \Delta h_{fir}^b[c-1]]^T$$

or $$\Delta h_{fir} = [\Delta h_{fir}^b[c-1] \ldots \Delta h_{fir}^b[1] \Delta h_{fir}^b[0] \Delta h_{fir}^b[-1] \ldots \Delta h_{fir}^b[-c]]^T$$ (Equation 12)

In the above Equation 12, T represents a transpose of the vector. In the above Equation 10, if a pseudo-inverse matrix for the $A_{\tilde{x}}$ is taken, the $\Delta h_{fir}$ is estimated like the following Equation 13.

$$\Delta \hat{h}_{fir} = A_{\tilde{x}}^{\dagger} v$$ (Equation 13)

In the above Equation 13, $A_{\tilde{x}}^{\dagger}$ represents the pseudo-inverse matrix of $A_{\tilde{x}}$. The $A_{\tilde{x}}$ is a matrix already calculated like the above Equation 11, and therefore the $A_{\tilde{x}}^{\dagger}$ may be obtained by calculation. Further, v is the matrix expression of the v[m] and the estimator 120 may receive the v[m] from the second baseband converter 260B to calculate the v. Therefore, the estimator 120 estimates the delta time response $\Delta h_{fir}$ to be estimated using the above Equation 13.

Next, the estimator 120 calculates attenuation $\Delta a$ to be updated (S520). To calculate the update attenuation $\Delta a$ of the FIR filter 240 from the delta time response expression of the above Equation 9, the $\Delta h_{fir}$ of the above Equation 13 may be represented by the following Equation 14.

$$\Delta \hat{h}_{fir} = s \Delta a$$ (Equation 14)

In the above Equation 14, s is represented by the following Equation 15.

$$s = \begin{bmatrix} e^{-j2\pi f_c d_0} \text{sinc}(-c-d_0 W) & \ldots & e^{-j2\pi f_c d_{N-1}} \text{sinc}(-c-d_{N-1} W) \\ \vdots & \vdots & \vdots \\ e^{-j2\pi f_c d_0} \text{sinc}(c-1-d_0 W) & \ldots & e^{-j2\pi f_c d_{N-1}} \text{sinc}(c-1-d_{N-1} W) \end{bmatrix}$$ (Equation 15)

or $$s = \begin{bmatrix} e^{-j2\pi f_c d_0} \text{sinc}(c-1-d_0 W) & \ldots & e^{-j2\pi f_c d_{N-1}} \text{sinc}(c-1-d_{N-1} W) \\ \vdots & \vdots & \vdots \\ e^{-j2\pi f_c d_0} \text{sinc}(-c-d_0 W) & \ldots & e^{-j2\pi f_c d_{N-1}} \text{sinc}(-c-d_{N-1} W) \end{bmatrix}$$

In the s like the above Equation 15, $f_c$ is the carrier frequency and is a value already known, $d_0$–$d_{N-1}$ are a fixed delay value and are a preset value, and W is a bandwidth and is a value already known. Therefore, the s may be obtained by the above Equation 15.

In the above Equation 14, the $\Delta a$ is represented by the following Equation 16.

$$\Delta a = [\Delta \hat{a}_0 \ \Delta \hat{a}_1 \ldots \Delta \hat{a}_{N-1}]^T$$ (Equation 16)

In the above Equation 14, the $\Delta \hat{h}_{fir}$ is the vector to be estimated obtained in S510 and s is also the value calculated by the above Equation 15, which are already known. Therefore, $\Delta a$ is obtained by the following Equation 17.

$$\Delta a = s^{\dagger} \Delta \hat{h}_{fir}, \ \Delta a = (s^H s)^{-1} s^H \Delta \hat{h}_{fir}$$

or $$\Delta a = s^{\dagger} \Delta \hat{h}_{fir}$$ (Equation 17)

Finally, the estimator 120 tunes the attenuation of the FIR filter 240 using the $\Delta a$ (S530). By using the $\Delta a$ obtained by the above Equation 17, the estimator 120 determines attenuation a u+1 to be updated based on the following Equation 18.

$$a(u+1) = a(u) + \Delta a$$ (Equation 18)

In the above Equation 18, a (u) represents the vector of the current attenuation and may be set to be any value as an initial value. Further, a u+1 represents the vector of the attenuation to be finally updated.

The FIR filter 240 applies the attenuation a u+1 to be updated determined by the above Equation 18 to the attenuator of the FIR filter 240. By doing so, the estimator 120 according to the exemplary embodiment of the present invention may minimize the self-interference signal.

According to the first exemplary embodiment of the present invention as described above, the input signal of the FIR filter 240 including the linear component and the nonlinear component is processed and estimated in the time domain and the attenuation of the FIR filter 240 is set using the estimated input signal, thereby obtaining the high SIC gain.

Figure 6:
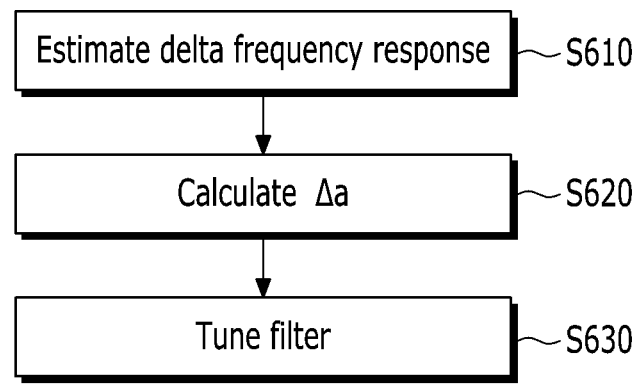
FIG. 6 is a flow chart of a method for tuning an FIR filter according to a second exemplary embodiment of the present invention.

FIG. 6 is a flow chart of a method for tuning an FIR filter according to a second exemplary embodiment of the present invention. The method for tuning an FIR filter according to the second exemplary embodiment of the present invention is a method for processing, by the estimator 120, data in a frequency domain to tune the FIR filter 240.

First, the estimator 120 estimates a delta frequency response (S610). To estimate the delta frequency response, the estimator 120 performs fast Fourier transform (FFT) on the v[m] input from the second baseband converter 260B. By doing so, the estimator 120 obtains V[k] which is a frequency expression for the v[m]. The expression for the V[k] is represented by the following Equation 19.

$$V(k) = Y(k) - Z(k) \quad \text{(Equation 19)}$$
$$= H_{ch}(k)S(k) - H_{fir}(k)S(k)$$
$$= (H_{ch}(k) - H_{fir}(k))S(k)$$
$$= \Delta H_{fir}(k)S(k), k = 0, 1, 2, \ldots, F-1$$

In the above Equation 19, k represents a subcarrier index and F represents a size of the FFT. Further, S(k) represents a value obtained by performing the FFT on the x̃[m] output from the first baseband converter 260A. That is, S(k) is a value obtained by performing the FFT on the baseband information on the input signal s(t) of the FIR filter 240. The estimator 120 may obtain the S(k) obtained by performing the FFT on the x̃[m] output from the first baseband converter 260A. Meanwhile $\Delta H_{fir}(k)$ is $H_{ch}(k)-H_{fir}(k)$, and represents a delta frequency response to be estimated.

In connection with the above Equation 19, de-patterning is performed on the S(k) depending on the following Equation 20. That is, the Equation 19 is divided by S(k).

$$\frac{V(k)}{S(k)} = \Delta H_{fir}(k), k = 0, 1, 2, \ldots, F-1 \quad \text{(Equation 20)}$$

As described above, the estimator 120 is obtained by calculating the V(k) and the S(k), and therefore the estimator 120 may use the above Equation 20 to calculate and estimate the delta time response $\Delta H_{fir}(k)$.

Meanwhile, in the above Equation 20, the $\Delta H_{fir}(k)$ may be represented by the following Equation 21.

$$\Delta H_{fir}(k) = \sum_{q=0}^{N-1} \Delta a_q e^{-j\frac{2\pi f_s k d_q}{F}} \quad \text{(Equation 21)}$$

$$\Delta H_{fir}(k) = \sum_{q=0}^{N-1} \Delta a_q e^{-j\frac{2\pi k d_q}{F}}$$

or $$\Delta H_{fir}(k) = \sum_{q=0}^{N-1} \Delta a_q e^{-j\frac{2\pi f_s k d_q}{F}}$$

In the above equation 15, $\Delta \alpha_q$ represents an update attenuation of q-th attenuator and fs represents a baseband sampling rate.

Next, the estimator 120 according to the exemplary embodiment of the present invention calculates the attenuation $\Delta a$ to be updated. To calculate the update attenuation $\Delta a$ of the FIR filter 240 from the delta frequency response expression of the above Equation 21, the above Equation 21 may be represented by a matrix expression like the following Equation 22.

$$\Delta H_{fir} = F\Delta a \begin{bmatrix} \Delta H_{fir}(0) \\ \Delta H_{fir}(1) \\ \ldots \\ \Delta H_{fir}(F-1) \end{bmatrix} = \quad \text{(Equation 22)}$$

$$\begin{bmatrix} 1 & 1 & \ldots & 1 \\ e^{-j\frac{2\pi f_s d_0}{F}} & e^{-j\frac{2\pi f_s d_1}{F}} & \ldots & e^{-j\frac{2\pi f_s d_{N-1}}{F}} \\ \ldots & \ldots & \ldots & \ldots \\ e^{-j\frac{2\pi f_s(F-1)d_0}{F}} & e^{-j\frac{2\pi f_s(F-1)d_1}{F}} & \ldots & e^{-j\frac{2\pi f_s(F-1)d_{N-1}}{F}} \end{bmatrix}$$

$$\begin{bmatrix} \Delta a_0 \\ \Delta a_1 \\ \ldots \\ \Delta a_{N-1} \end{bmatrix}$$

or $$\Delta H_{fir} = F\Delta a \begin{bmatrix} \Delta H_{fir}(0) \\ \Delta H_{fir}(1) \\ \ldots \\ \Delta H_{fir}(F-1) \end{bmatrix} =$$

$$\begin{bmatrix} 1 & 1 & \ldots & 1 \\ e^{-j\frac{2\pi d_0}{F}} & e^{-j\frac{2\pi d_1}{F}} & \ldots & e^{-j\frac{2\pi d_{N-1}}{F}} \\ \ldots & \ldots & \ldots & \ldots \\ e^{-j\frac{2\pi(F-1)d_0}{F}} & e^{-j\frac{2\pi(F-1)d_1}{F}} & \ldots & e^{-j\frac{2\pi(F-1)d_{N-1}}{F}} \end{bmatrix}$$

$$\begin{bmatrix} \Delta a_0 \\ \Delta a_1 \\ \ldots \\ \Delta a_{N-1} \end{bmatrix}.$$

In the above Equation 22, $f_s$ is the baseband sampling rate and is a value already known, F is a size of the FFT and is a value already known, and $d_0-d_{N-1}$ are fixedly delayed values and is a preset value. Therefore, a matrix F may be a value that may be obtained by calculation.

In above Equation 12, if the inverse matrix or the pseudo-inverse matrix is performed on the F, the $\Delta a$ is represented by the following Equation 13.

$$\Delta a = F^{\dagger} \Delta H_{fir} \quad \text{(Equation 23)}$$

In the above Equation 23, $F^{\dagger}$ represents an inverse matrix or a pseudo-inverse matrix of the F when N=F and represents the inverse matrix of the F when N<F. $\Delta H_{fir}$ is a vector obtained by the previous estimation in S610 and F is also a value calculated by the above Equation 22 and is already known, such that the $\Delta a$ is calculated based on the above Equation 23.

Finally, the estimator 120 according to the exemplary embodiment of the present invention uses the $\Delta a$ to tune the attenuation of the FIR filter 240DeletedTexts. By using the Δa obtained by the above Equation 23, the estimator 120 determines attenuation a u+1 to be updated based on the following Equation 24.

$$a(u+1)=a(u)+\Delta a \quad \text{(Equation 24)}$$

In the above Equation 24, a(u) represents the vector of the current attenuation and may be set to be any value as an initial value. Further, a u+1 represents the vector of the attenuation to be finally updated.

The FIR filter 240 applies the attenuation a u+1 to be updated determined by the above Equation 24 to the attenuator of the FIR filter 240. By doing so, the estimator 120 according to the exemplary embodiment of the present invention may minimize the self-interference signal.

According to the second exemplary embodiment of the present invention as described above, the input signal of the FIR filter 240 including the linear component and the nonlinear component is processed and estimated in the frequency domain and the attenuation of the FIR filter 240 is set using the estimated input signal, thereby obtaining the high SIC gain.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for tuning a finite impulse response (FIR) filter in an in-band full duplex transceiver, the FIR filter receiving a transmitted signal to cancel a self-transmitted interference signal, the method comprising: converting, by the in-band full duplex transceiver, an input signal of the FIR filter into a first signal that is a baseband equivalent signal;
   converting, by the in-hand full duplex transceiver, a signal obtained by subtracting an output signal of the FIR filter from the self-transmitted interference signal into a second signal that is the baseband equivalent signal;
   estimating, by the in-band full duplex transceiver, a delta time response using the first signal and the second signal;
   calculating, by the in-band full duplex transceiver, attenuation of the FIR filter using the first signal and the second signal; and
   applying, by the in-band full duplex transceiver, the attenuation to the FIR filter,
   wherein the delta time response corresponds to a value obtained by subtracting a baseband equivalent time impulse response for the FIR filter from a baseband equivalent time impulse response for a radio channel.

2. The method of claim 1, wherein the calculating of the attenuation includes calculating the attenuation using the delta time response.

3. A method for tuning a finite impulse response (FIR) filter in an in-band full duplex transceiver, the FIR filter receiving a transmitted signal to cancel a self-transmitted interference signal, the method comprising:
   converting, by the in-band full duplex transceiver, an input signal of the FIR filter into a first signal that is a baseband equivalent signal;
   converting, by the in-band full duplex transceiver, a signal obtained by subtracting an output signal of the FIR filter from the self-transmitted interference signal into a second signal that is the baseband equivalent signal;
   calculating, by the in-band full duplex transceiver, attenuation of the FIR filter using the first signal and the second signal; and
   applying, by the in-band full duplex transceiver, the attenuation to the FIR filter;
   acquiring, by the in-band full duplex transceive, a third signal by performing fast Fourier transform (FFT) on the first signal; and
   acquiring by the in-band full duplex transceiver, a fourth signal by performing the FFT on the second signal,
   wherein the calculating of the attenuation includes calculating the attenuation using the third signal and the fourth signal.

4. The method of claim 3, further comprising estimating a delta frequency response using the third signal and the fourth signal.

5. The method of claim 4, wherein the calculating of the attenuation includes calculating the attenuation using the delta frequency response.

6. The method of claim 4, wherein the delta frequency response corresponds to a value obtained by subtracting a frequency response of the FIR filter from a frequency response of a radio channel.

7. The method of claim 1, wherein the input signal of the FIR filter includes a linear component and a nonlinear component.

8. An in-band full duplex transceiver comprising:
   a transmitter generating and transmitting a transmitted signal;
   a finite impulse response (FIR) filter receiving the transmitted signal to cancel a self-transmitted interference signal;
   a receiver converting a first signal that is a signal obtained by subtracting an input signal of the FIR filter from the self-transmitted interference signal into a second signal that is a baseband frequency signal and converting an input signal of the FIR filter into a third signal that is a baseband frequency signal; and
   an estimator using the second signal and the third signal to set the attenuation of the FIR filter,
   wherein the estimator acquires a fourth signal by performing fast Fourier transform (FFT) on the second signal and a fifth signal by performing the FFT on the third signal and calculates the attenuation using the fourth signal and the fifth signal.

9. The in-band full duplex transceiver of claim 8, wherein the receiver includes:
   a first baseband converter converting the first signal into the second signal; and
   a second baseband converter converting the input signal of the FIR filter into the third signal.

10. The in-band full duplex transceiver of claim 9, wherein:
   the first baseband converter includes a variable gain controller receiving the first signal to adjust a power level, a first mixer multiplying a carrier frequency by an output signal of the variable gain controller to converting an RF signal into a baseband frequency signal, and a first analog digital converter converting an output signal of the first mixer into a digital signal, and
   the second baseband converter includes a low noise amplifier receiving and amplifying the first signal, a second mixer multiplying the carrier frequency by an output signal of the low noise amplifier to converting the RF signal into the baseband frequency signal, and a second analog digital converter converting an output signal of the second mixer into the digital signal.

11. The in-band full duplex transceiver of claim 9, wherein the first signal and the input signal of the FIR filter are shuffled to be input to the first baseband converter and the second baseband converter, respectively.

12. The in-band full duplex transceiver of claim 8, wherein the estimator estimates a delta time response using the second signal and the third signal and calculates the attenuation using the delta time response.

13. The in-band full duplex transceiver of claim 8, wherein the estimator estimates a delta frequency response using the fourth signal and the fifth signal and calculates the attenuation using the delta frequency response.

14. The in-band full duplex transceiver of claim 12, wherein the delta time response corresponds to a value obtained by subtracting a baseband equivalent time impulse response for the FIR filter from a baseband equivalent time impulse response for a radio channel.

15. The in-band full duplex transceiver of claim 13, wherein the delta frequency response corresponds to a value obtained by subtracting the frequency response of the FIR filter from a frequency response of a radio channel.

* * * * *